Feb. 18, 1958 H. MASSEY 2,823,802
MACHINE FOR REMOVING MOSS FROM WATER
FLOWING IN AN IRRIGATION DITCH
Filed Aug. 15, 1955 2 Sheets-Sheet 1

INVENTOR.
Hubert Massey
BY Scott L. Norviel
Atty.

Feb. 18, 1958 H. MASSEY 2,823,802
MACHINE FOR REMOVING MOSS FROM WATER
FLOWING IN AN IRRIGATION DITCH
Filed Aug. 15, 1955 2 Sheets-Sheet 2
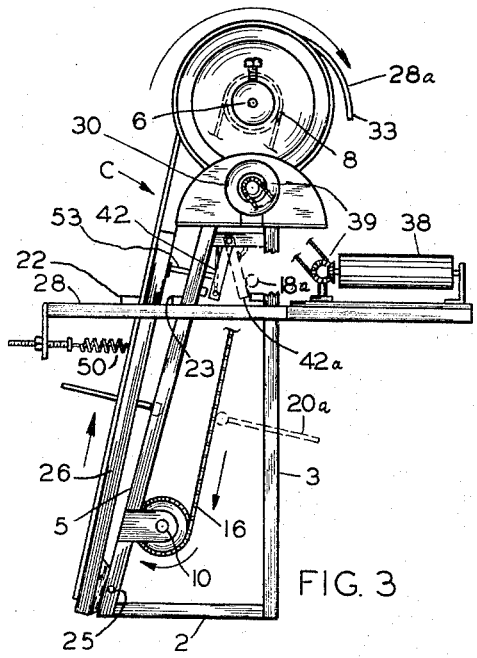
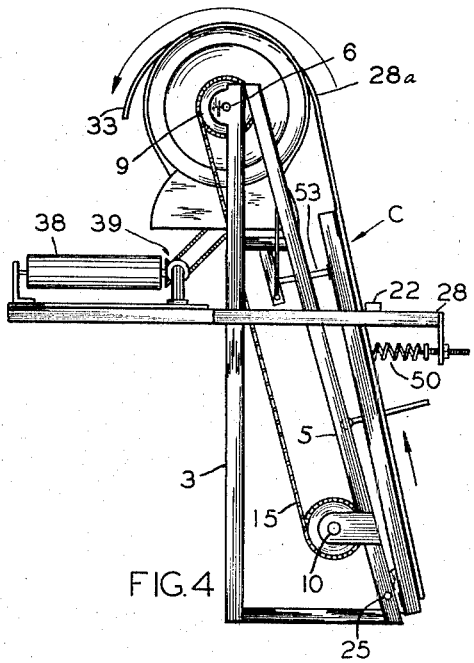
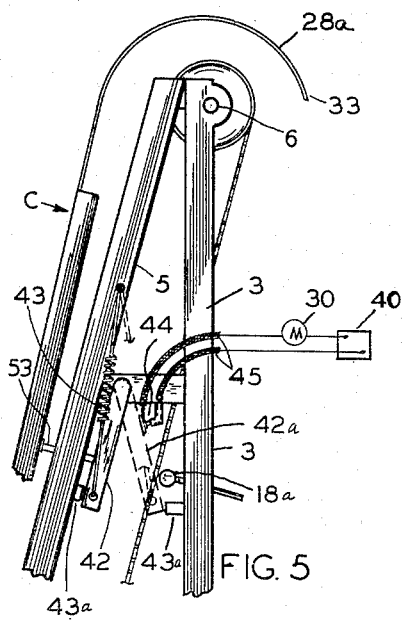
INVENTOR.
Hubert Massey
BY Scott L. Norvied
atty United States Patent Office 2,823,802
Patented Feb. 18, 1958

2,823,802

MACHINE FOR REMOVING MOSS FROM WATER FLOWING IN AN IRRIGATION DITCH

Hubert Massey, Gilbert, Ariz.

Application August 15, 1955, Serial No. 528,351

5 Claims. (Cl. 210—143)

This invention pertains to machines for removing moss from the water flowing in irrigation ditches.

Moss has always been present in the waters flowing in canals and irrigation ditches but little attention was paid to it until the advent of the comparatively small aluminum siphon tubes which are now extensively used to siphon water from the ditch to the lands and furrows. These tubes are usually made of aluminum and are approximately two to three inches in diameter. This small size tends to clog with moss so that either the flow is diminished or altogether stopped. This problem requires the entire time of an irrigator during the period of irrigation, in addition to the usual irrigator who follows the flow of the water to assure an even flow over the irrigated area.

Ordinary screens cannot be used because they quickly clog with moss and become ineffective.

One of the objects of this invention is to provide a portable moss remover for irrigation ditches which will screen out moss and operate automatically to dispose of the moss whenever it accumulates on the screen in any predetermined amount.

Another object is to provide a portable irrigation ditch grating which may be positioned in an irrigation ditch and will catch moss floating in the water, and will then automatically remove the moss from the grating and deposit it on the ditch bank; said automatic operation occurring at intervals determined by the resistance to water flow of moss accumulated on the screens.

Another object is to provide a portable moss screening and removal machine which is adapted to operate on portable power supplied by mechanism which may be quickly erected in an irrigation ditch and will operate intermittently to remove moss and deposit it on the bank of the ditch, when moss accumulates on a grating type screen.

Another object is to provide intermittently operating mechanism which will clear a grating of accumulated moss and then discontinue operating so that energy is not expended in operating the mechanism when no moss is present on the grating.

Other objects will appear hereinafter.

I attain the foregoing objects by means of the machine, mechanism, devices, and combinations of parts illustrated in the accompanying drawings, hereby made a part hereof, in which—

Figure 3 is a side elevation of the right hand portion of the machine as viewed in Figure 2;

Figure 4 is a view of the left hand side of the machine as viewed in Figure 2; and Figure 5 is a side elevation of the upper portion of the machine showing the switch bar in open circuit position and its motion to closed circuit position by dotted outline.

Similar numerals refer to similar parts in the several views.

Figure 1:
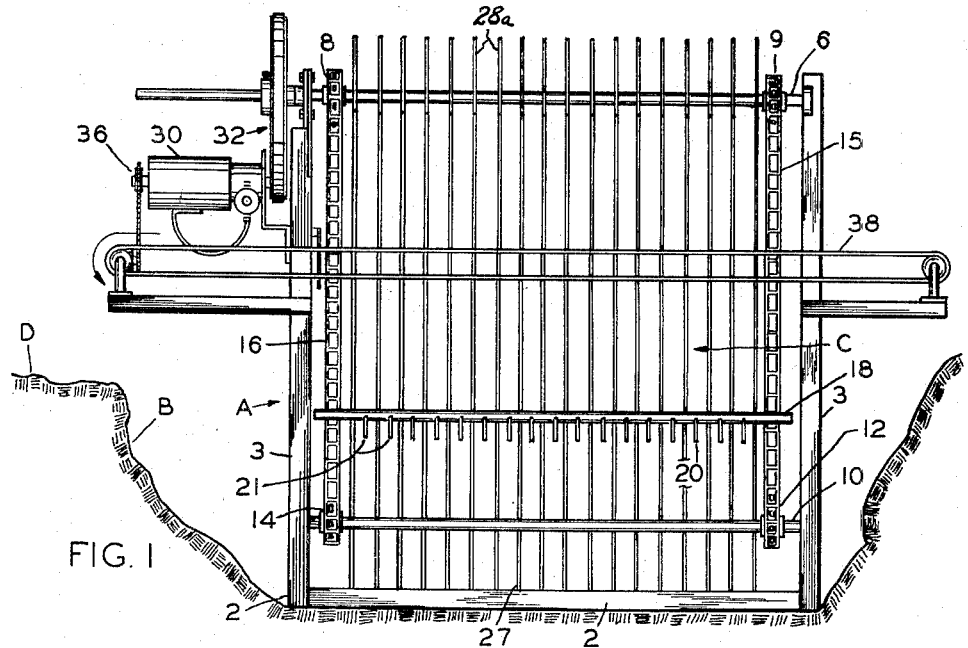
Figure 1 is an elevation of an entire machine, incorporating my improvements, as viewed from the downstream side of the grating.
Figure 2:
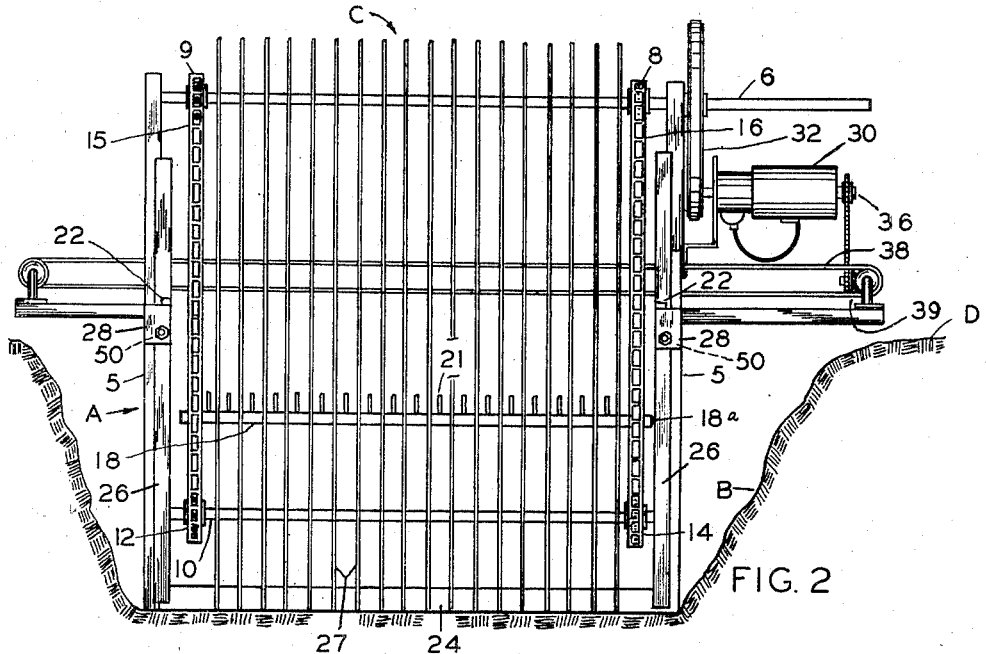
Figure 2 is a front or upstream elevation of the same machine.

The machine consists generally of a frame A which has a rectangular base 2 adapted to fit into and rest on the bottom of an irrigating ditch B. From this base there are laterally disposed frame members 3 extending upward from each end of the back or downstream edge of the base. From the front edge of the base there are upwardly and rearwardly slanting lateral members 5. These are joined at the top to the tops of the vertical members 3.

At the bottom of the forward frame members 5 there is a transversely extending grating support bar 24 which is hinged at each end by hinge pins 25 to the lateral frame members 5. At each end of this bar there are upwardly extending control arms 26. These arms limit and control the hinging movement of bar 24 and their movement is guided by guide members 28 extending forward (up stream) from the middle portion of frame members 5. Stops 22 on members 28 limit the forward hinging motion of arms 26, and stops 23 limit their rearward motion. At closely spaced intervals along base bar 24 there are a number of parallel grating rods 27. These rods form a moss barrier or screen C. These rods extend upwardly from the base bar slanting rearwardly, and at the top are curved rearwardly and downwardly forming semicircular top end portions 28a.

A transversely extending shaft 6 is journalled in bearings positioned near the top ends of frame members 3. This shaft carrier sprockets 8 and 9. Within the bottom portion of the frame A and journalled in bearings attached to frame members 5 there is a second transversely extending shaft 10, which carries sprockets 12 and 14. Chains 15 and 16 run over sprockets 9 and 12, and 8 and 14, respectively. At a predetermined position there is a transverse bar 18 attached at its ends to each of the chains 15 and 16. This bar carries a comb 20 consisting of a number of transversely spaced teeth 21. The teeth 21 of comb 20 are spaced so that they move between the grating rods 27. The curved portions 28a of each of the rods 27 are disposed so that they substantially surround shaft 6. Shaft 6 is driven by an electric motor 30 through pulleys and belt 32 so that it turns at a comparatively slow speed. This causes the chains 15 and 16 running on their respective sprockets to operate comb 20 so that on its forward travel the teeth 21, protruding between the grating rods 27, move upwardly between these rods and then pass around the upper end portions 28a of rods 27 and downwardly past the rod ends 33.

A speed reduction gearing 36 is attached to motor 30 and drives an endless transversely extending belt 38 through bevel gearing 39. This belt travels at a comparatively slow speed and is disposed below the rod ends 33 on the downstream side of the machine. Its deposit end extends over the bank of the ditch so that moss will be carried clear of the ditch.

Motor 30 is furnished with power from a suitable storage battery 40. The circuit from the battery to the motor includes a switch bar 42 pivoted at its top, and arranged to assume either an on rearward or off forward position on opposite sides of a dead center. A spring 43 urges bar 42 to remain in either of these positions against suitable stops 43a. When in the rear position, indicated by dotted lines 42a, the switch makes contact at 44 and closes the circuit through conductors 45 and operates motor 30. When in the forward position, indicated in solid lines, contact is broken.

The guide arms 28 which extend forwardly from the middle of frame members 5 are provided with springs 50 which are attached at approximately the middle portion of arms 26 and normally urge the arms against stops 22. This rotates base bar 24 forward so that all the grating rods hinge forward. A push rod 53 extends from the arm 26 on the left hand, or motor side, of the frame to the switch bar 42. When the grating bars are in normal forward position this push rod merely contacts the switch bar. When the grating rods become loaded with moss the entire grating tends to hinge rearward, against the urge of springs 50, due to the pressure of the flow of the water in the ditch on the accumulated moss. This causes push rod 53 to move the switch bar 42 to the position indicated by dotted lines 42a and thereby makes contact at 43 and operates motor 30.

Operation of motor 30 causes the comb to lift the moss upward along the grating rods and over their upper end portions and downward toward their rear ends 33. The moss then falls upon the belt 38 which carries it to the ditch bank at D.

The operation of the motor continues until the right end of the bar of comb 18 passes the switch bar in the position 42a. The end 18a of the comb bar then contacts the switch bar and moves it over dead center and forward to the position it originally occupied, as indicated by numeral 42. This stops the operation of motor 30. The comb 20 then assumes the position indicated by dotted lines 20a where it remains until a succeeding operation is caused by the reaccumulation of moss on the grating rods.

It is to be understood that the base 2 is of such size and weight that will fit into and rest on the bottom of any average irrigation ditch. The frame A is therefore self-supporting and need not ordinarily be fastened to any post or other means of support. After the machine is installed in the ditch the operation is automatic, as above explained. Whenever moss accumulates sufficiently to hinge the grating rods rearwardly, or downstream, against the tension of springs 50, switch 42 is moved to the closed position and the motor operates. This operation is therefore intermittent and each period of operation is sufficient to clear the grating rods of accumulated moss, and to deposit this moss on the belt 38. The belt thereafter carries the moss to the desired place of deposit at the side of the ditch.

I claim:

1. A machine for removing floating moss from water flowing in an irrigation ditch consisting of a frame having a base adapted to rest on the bottom of an irrigation ditch, having upwardly extending end elements, a rearwardly and upwardly slanting grating consisting of a plurality of spaced parallel rods attached at their bottom ends to a transverse bar, hinged to the upstream part of the base of said frame, and having semi-circular curved portions at their upper portions with their ends directed downward, a comb, operating on parallel chains, disposed on the down stream side of said grating, supported on sprockets and shafts journalled at the top and bottom, respectively, of said frame end elements, having teeth extending between said grating rods adapted to lift moss caught by said grating over the curved top portions of said rods, means for resiliently hinging said grating in a predetermined forward position, means for operating the shafts supporting the chains carrying said comb intermittently, whenever a predetermined amount of moss accumulates on said grating, including an electric motor driving said shafts, a power supply therefor, and a pivotally mounted control switch operated by the hinging movement of said grating, closing when said grating swings down stream due to the pressure of water flowing down said ditch on moss caught on said grating, and opening when said moss is removed from said grating by said comb.

2. A machine for removing floating moss from water flowing in an irrigation ditch consisting of a frame having a base adapted to rest on the bottom of an irrigation ditch, having upwardly extending end elements, a rearwardly and upwardly slanting grating consisting of a plurality of spaced parallel rods attached at their bottom ends to a transverse bar, hinged to the upstream part of the base of said frame, and having semi-circular curved portions at their upper portions with their ends directed downward, a comb, operating on parallel chains, disposed on the down stream side of said grating, supported on sprockets and shaft journalled at the top and bottom, respectively, of said frame end elements, having teeth extending between said grating rods adapted to lift moss caught by said grating over the curved top portions of said rods, means for resiliently hinging said grating in a predetermined forward position, means for operating the shafts supporting the chains carrying said comb intermittently, whenever a predetermined amount of moss accumulates on said grating, including an electric motor driving said shafts, a power supply therefor, and a pivotally mounted control switch operated by the hinging movement of said grating, closing when said grating swings down stream due to the pressure of water flowing down said ditch on moss caught on said grating, and opening when said moss is removed from said grating by said comb, and a transversely operating conveyer belt disposed below the ends of said rods and extending laterally to a position above the bank of a ditch in which the machine is placed.

3. In a machine for removing moss floating in irrigation water flowing in an irrigation ditch, a frame adapted to rest in the bottom of the irrigation ditch, having upright members, an upwardly and rearwardly extending grating of parallel rods attached at the bottom to a transverse bar hinged to the bottom portion of said frame, and having rearwardly and downwardly curved upper ends, arms extending upward from said transverse bar, engaging portions of said frame to limit hinging motion of said grating and maintain it resiliently in upstream hinged position, a comb having teeth extending forwardly between said grating rods, operating on the down stream side of said grating, so that said teeth travel upward between said grating rods and over the upper curved portions thereof to remove moss caught by said grating, mechanism, including a motor, started by down stream hinging motion of said grating due to flow resistance of accumulated moss, and stopped by the upstream hinging action of said grating upon removal of said moss by said comb.

4. A portable machine for removing floating moss from water flowing in an irrigation ditch, consisting of a frame having a base adapted to rest on the bottom of an irrigation ditch, having upwardly extending end elements, a rearwardly and upwardly slanting grating consisting of a plurality of spaced parallel rods attached at their bottom ends to a transverse bar hinged to the upstream part of the base of said frame and having semi-circular curved upper end portions with the tips of said ends directed downward, a comb operating on parallel chains disposed on the downstream side of said grating, supported on sprockets and shafts journalled at the top and bottom, respectively, of said frame end elements, said comb having teeth extending between said grating rods adapted to lift moss from said grating over the curved end portions of said grating rods, spring means resiliently hinging said grating in a predetermined upstream position, means for operating the shafts supporting the chains carrying said comb intermittently, whenever a predetermined amount of moss accumulates on said grating, including an electric motor driving said shafts carrying said sprockets and chains, a power supply for said motor, and a pivotally mounted control switch operated by the hinging movement of said grating consisting of a downwardly depending switch bar pivotally supported on said frame, having spring means for holding said bar in either forward open circuit position or rearward downstream closed circuit position, electrical contacts on said frame operating to close the circuit through said electric motor when said bar is in said downstream closed circuit position, a push rod operative with said grating disposed to contact said switch bar and move it to the downstream closed circuit when said grating moves downstream due to accumulation of moss, and a comb bar on said comb disposed to contact said switch bar and move it to forward open circuit position after said comb has passed upward and over said grating and has moved downward on the downstream side of its travel.

5. A portable machine for removing floating moss from water flowing in an irrigation ditch, consisting of a frame having a base adapted to rest on the bottom of an irrigation ditch and having upwardly extending end elements and horizontal laterally disposed guide arms, a rearwardly and upwardly slanting grating consisting of plurality of spaced parallel rods attached at their bottom ends to a transverse bar having upwardly extending grating frame arms as its ends disposed parallel with said grating rods and moving between said guide rods on said frame; said transverse bar being hinged to the upstream part of the base of said frame, said parallel rods having semi-circular curved portions at their upper ends, a comb operating on parallel chains disposed on the downstream side of said grating, supported on sprockets and shafts journalled at the top and bottom, respectively, of said frame end elements, having teeth extending between said grating rods adapted to lift moss caught by said grating over the curved top portions of said rods, spring means operating between said grating frame arms and said guide arms on said frame holding said grating in a predetermined upstream position, means for operating said shafts supporting the chains carrying said comb intermittently, when a predetermined amount of moss accumulates on said grating, including an electric motor driving said shafts, a power supply therefor, and a switch mounted on said frame, connected to said motor, and consisting of a downwardly depending switch bar pivotally supported on said frame having spring means for holding in either a forward upstream off position or a rearward downstream closed circuit position, electrical contacts on said frame operating to close the circuit through said electric motor when said bar is in said downstream closed circuit position, a push rod on said grating frame arms disposed to contact said switch bar and move it to rearward downstream closed circuit position when said grating moves to downstream position, due to accumulation of moss, and a comb bar on said comb disposed to contact said switch bar and move it to forward open circuit position after said comb has passed upward through and over said grating, and has moved downward on the downstream side of its travel.

References Cited in the file of this patent

UNITED STATES PATENTS

| | | |
|---|---|---|
| 452,702 | Grabill | May 19, 1891 |
| 1,180,798 | Spoon | Apr. 25, 1916 |
| 1,256,837 | Smith | Feb. 19, 1918 |
| 2,092,623 | Kuster | Sept. 7, 1937 |